United States Patent [19]

Kraus

[11] 4,339,651
[45] Jul. 13, 1982

[54] METHOD FOR SOLDERING LEADS TO ELECTRICAL COMPONENTS

[75] Inventor: Hubert Kraus, Regensburg, Fed. Rep. of Germany

[73] Assignee: Siemens Aktiengesellschaft, Berlin & Munich, Fed. Rep. of Germany

[21] Appl. No.: 185,396

[22] Filed: Sep. 8, 1980

[51] Int. Cl.³ .............................................. B23K 1/02
[52] U.S. Cl. .............................. 219/85 CM; 29/25.42; 228/179; 228/208; 361/273
[58] Field of Search ................... 219/85 CM, 85 CA; 228/179, 208; 361/273, 308, 309; 29/25.42

[56] References Cited

U.S. PATENT DOCUMENTS 3,381,081 4/1968 Schalliol ...................... 219/85 CM
3,444,347 5/1969 Mulcahy ...................... 219/85 CM
3,693,244 9/1972 Behn et al. .
3,857,074 12/1974 Heywawo .......................... 361/273

Primary Examiner—Elliot A. Goldberg
Attorney, Agent, or Firm—Hill, Van Santen, Steadman, Chiara & Simpson

[57] ABSTRACT

A method is disclosed for soldering leads to electrical components such as capacitors on which a thin contacting layer of solder metal is provided. The leads are soldered on by pressing them into the contact layer by means of two electrodes. The leads are heated by a current which flows between the electrodes. In order to save material, the leads are contacted by the electrodes along the entire extent to be sealed in to heat them uniformly and to press them into the contact layer. This method is suitable for contacting capacitors whose dielectrics consist of synthetic films and whose coatings consist of regenerable thin metalizations.

11 Claims, 2 Drawing Figures

METHOD FOR SOLDERING LEADS TO ELECTRICAL COMPONENTS

BACKGROUND OF THE INVENTION

The present invention relates to a method for soldering leads to electrical components, particularly electrical capacitors with synthetic films as the dielectrics, regenerable thin coatings, and front contact layers consisting of solder metal. A lead is brought over the front contact layer and two electrodes are impressed on the lead. The lead on which the electrodes are impressed is therefore contacted and heated by an electrical current, and is pressed into the solder which thereby melts.

Such a method is known from the German Utility Model No. 66 10 477, corresponding to U.S. Pat. No. 3,693,244, incorporated herein by reference. According to this method, leads are contacted by electrodes and melted into the solder metal at two locations which lie behind one another in the axial direction of the wire.

SUMMARY OF THE INVENTION

An object underlying the present invention consists in providing a uniform, fault-free contacting of capacitors by leads which permit the use of thinner front contact layers.

This object is achieved by means of a method of the type initially described in that the contact surfaces of the electrodes are pressed onto the wire or lead in such manner that they at least partially contact the wire along peripheral lines in such manner that these lines form a region with triangular cross-section with the axis of symmetry of the wire.

Due to this arrangement, the current flow ensues in directions perpendicular to the axis of the wire; there thus follows a heating of the lead which is independent of the length of the wire. At the same time, the pressure is uniformly exerted on the entire part of the wire to be sealed in, whereby a uniform heating and a uniform sealing-in of the wire is possible.

Advantageously, the wire is pressed by the electrodes into the solder metal far enough that the melting solder metal rises on the wire and fills up the interstices between the contact surfaces and the wire up to the lines of contact between the wire and the contact surfaces. By so doing, the wire is enclosed with solder metal, thus effecting an improved contacting and mechanical support of the wire without having to design the layer of solder metal thicker. The method can be advantageously employed for contacting on spray metal layers which are manufactured according to the well-known Schoop method.

The penetration depth of the lead is advantageously limited by the end faces of the electrodes facing the component, in that the lead is pressed into the front contact layer until the end faces of the electrodes lie on the front contact layers of the component. Thus, depending upon the design of the electrodes, the wire can be pressed in up to a specifically predeterminable penetration depth. By so doing, the front contact layer and the capacitor lying thereunder are only subjected to a low surface load. An undesired breach of the wire into the capacitor is avoided.

An advantageous device for implementing the proposed method by use of electrodes with contact surfaces and wherein the electrodes are pressed onto the lead, exhibits the features that the contact surfaces of the electrodes are inclined with respect to one another and diverge from one another toward the wire. The projections of the contact surfaces at least partially overlap in the direction perpendicular to their direction of motion (A) and to the axis of the wire. A particularly stable mechanical support of the wires in the front contact layers is achieved in that the electrodes exhibit recesses arranged behind one another in the direction of the axis of the wire. Into the recesses solder metal can flow to form a stable support for the wires. After the solder metal has cooled, strap-like supports are thus formed for the lead. The recesses are advantageously formed by means of rectangular grooves which proceed from those end faces of the electrodes facing the capacitor.

DESCRIPTION OF THE PREFERRED EMBODIMENTS

Figure 1:
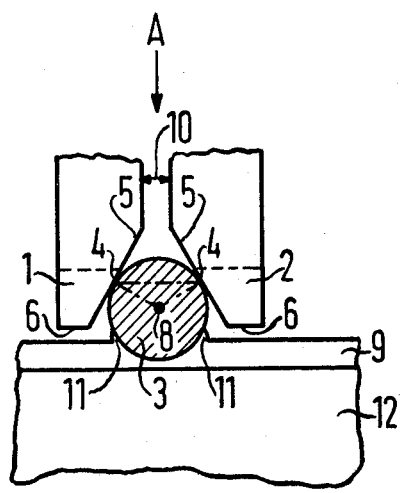
FIG. 1 shows an inventive device from a direction which coincides with the longitudinal direction of the wire.
Figure 2:
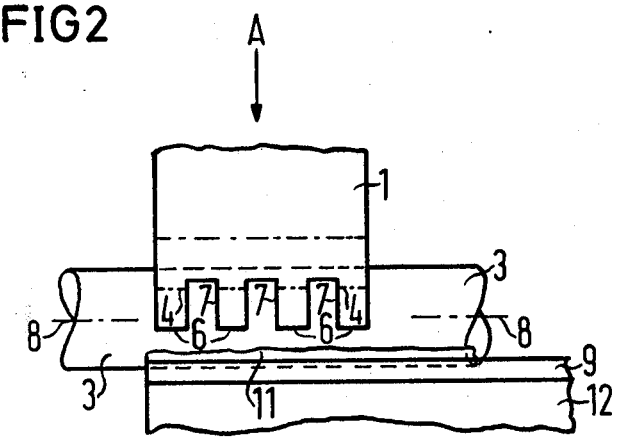
FIG. 2 shows the same device from a direction perpendicular to the longitudinal direction of the wire.

Two electrodes 1 and 2 press a wire 3 against a front contact layer 9 of a component 12 in the direction of arrow A and serve for heating the wire or lead 3 when current is applied. Thereby, the contact surfaces 5 of the electrodes 1, 2 contact the lead 3 at contact lines 4 which correspond to peripheral lines of the lead or wire 3. Together with the axis 8 of the wire, the contact lines 4 from a region with triangular cross-section whose height is given by the mutual position of the electrodes 1 and 2 in the direction of axis 8. The end faces 6 of the electrodes 1 and 2 limit the penetration depth of the lead 3 into the front contact layer 9 of the component. The penetration depth, for example, can be set by the interval 10 between the electrodes 1 and 2.

The electrodes 1 and 2 exhibit recesses 7 which proceed from the end faces 6 and have the form of grooves. The rising solder metal 11 can penetrate into these recesses 7 when the leads are sealed in. Thus, the solder metal forms support clamps which at least partially embrace the lead 3. Thus, a particularly secure mechanical support and a fault-free contact is guaranteed even given higher mechanical loads.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for soldering a lead to an electrical capacitor having a synthetic film as a dielectric, a regenerable thin coating and a front contact layer of solder metal, comprising the steps of: positioning a lead over the front contact layer; pressing two electrodes onto the lead to contact the lead at contact surfaces of the electrodes; positioning the contact surfaces of the electrodes to contact the lead along spaced apart parallel contact lines directly across from each other which extend longitudinally along the lead on a periphery thereof substantially along an entire desired region of melted solder engagement between the lead and the contact layer and which together with a longitudinal central axis of symmetry of the lead define points of a prism-like region of triangular cross-section within the lead; and applying a current to the electrodes which flows substantially perpendicular to the lead axis to heat the lead and press it into the solder which thereby melts.

2. A method according to claim 1 wherein the lead is pressed into the solder metal by the electrodes until the melting solder metal rises on the lead and fills up interstices between the contact surfaces and the lead up to the contact lines between the lead and the contact surfaces.

3. A method according to claim 1 wherein the lead is pressed into the front contact layer until end faces of the electrodes rest against the front contact layer of the capacitor.

4. A method according to claim 1 wherein recesses are provided in each of the electrodes, and during the heating and pressing in of the lead the solder metal rises up into the recesses to form finger-like support portions partially wrapped around the wires.

5. A method according to claim 4 wherein the recesses are provided in each electrode in comb-like fashion.

6. A method for soldering a substantially cylindrical lead to an electrical component having a thin contact layer of solder metal, comprising the steps of:
providing first and second spaced apart electrodes positioned directly across from each other and on opposite sides of the lead with each electrode having a lead contact surface;
pressing the two electrodes onto the cylindrical lead such that lines of contact are established along two longitudinally extending peripheral lines of the lead which together with a central longitudinal axis of the cylindrical lead form points of a prism-like region of triangular cross-section within the lead, the electrodes being shaped to contact the lead substantially along an entire desired region of melted solder engagement between the lead and the contact layer; and
applying current to the two electrodes to heat up the lead and pressing the lead by use of the electrodes against the contact layer so as to heat the solder metal and melt the same, the solder flowing upwardly towards the contact lines on the lead.

7. A method according to claim 6 wherein the contact surfaces of the electrodes are angled with respect to one another to form a partial "V" shape when viewed along the central longitudinal axis of the lead.

8. A method according to claim 6 wherein recesses are provided in each of the electrodes into which solder flows during heating so as to form finger-like projections of solder for retaining the lead to the contact layer.

9. A method for soldering a lead to an electrical capacitor having a synthetic film as a dielectric, a regenerable thin coating and a front contact layer of solder metal, comprising the steps of: positioning a lead over the front contact layer; pressing two electrodes onto the lead to contact the lead at contact surfaces of the electrodes; positioning the contact surfaces of the electrodes to contact the lead along contact lines which extend longitudinally along the lead on a periphery thereof and which together with a longitudinal central axis of symmetry of the lead define points of a region of triangular cross-section lying within the lead; applying a current to the electrodes to heat the lead and press it into the solder which thereby melts; and wherein comb-like recesses are provided in each of the electrodes, and during the heating and pressing in of the lead the solder metal rises up into the recesses to form support portions for the wires.

10. A method for soldering a lead to an electrical component having a thin contact layer of solder metal, comprising the steps of:
providing first and second spaced apart electrodes positioned on opposite sides of the lead with each electrode having a lead contact surface;
pressing the two electrodes onto the lead such that lines of contact are established along two longitudinally extending peripheral lines of the lead which together with a central longitudinal axis of the lead form points of a region of triangular cross-section within the lead, the electrodes contacting the lead substantially along an entire desired region of engagement between the lead and the contact layer;
applying current to the two electrodes to heat up the lead and pressing the lead by use of the electrodes against the contact layer so as to heat the solder metal and melt the same, the solder flowing upwardly towards the contact lines on the lead; and
wherein the contact surfaces of the electrodes are angled with respect to one another to form a partial "V" shape when viewed along the central longitudinal axis of the lead.

11. A method for soldering a lead to an electrical component having a thin contact layer of solder metal, comprising the steps of:
providing first and second spaced apart electrodes poistioned on opposite sides of the lead with each electrode having a lead contact surface;
pressing the two electrodes onto the lead such that lines of contact are established along two longitudinally extending peripheral lines of the lead which together with a central longitudinal axis of the lead form points of a region of triangular cross-section within the lead, the electrodes contacting the lead substantially along an entire desired region of engagement between the lead and the contact layer;
applying current to the two electrodes to heat up the lead and pressing the lead by use of the electrodes against the contact layer so as to heat the solder metal and melt the same, the solder flowing upwardly towards the contact lines on the lead; and
wherein recesses are provided in each of the electrodes into which solder flows during heating so as to form finger-like projections of solder for retaining the lead to the contact layer.

* * * * *